US012345161B2

(12) United States Patent
Salvatori et al.

(10) Patent No.: US 12,345,161 B2
(45) Date of Patent: Jul. 1, 2025

(54) HIGH-PRESSURE GAS TURBINE FOR A TURBINE ENGINE AND TURBINE ENGINE

(71) Applicant: SAFRAN AIRCRAFT ENGINES, Paris (FR)

(72) Inventors: Francesco Salvatori, Moissy-Cramayel (FR); Damien Bonneau, Moissy-Cramayel (FR); Nicolas Contini, Moissy-Cramayel (FR); Clément Jarrossay, Moissy-Cramayel (FR); Pascal Cédric Tabarin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/694,563

(22) PCT Filed: Sep. 2, 2022

(86) PCT No.: PCT/FR2022/051663

§ 371 (c)(1),
(2) Date: Mar. 22, 2024

(87) PCT Pub. No.: WO2023/047034

PCT Pub. Date: Mar. 30, 2023

(65) Prior Publication Data

US 2024/0392692 A1 Nov. 28, 2024

(30) Foreign Application Priority Data

Sep. 27, 2021 (FR) ....................................... 2110133

(51) Int. Cl.
*F01D 11/04* (2006.01)
*F01D 11/00* (2006.01)
*F01D 11/02* (2006.01)

(52) U.S. Cl.
CPC ............ *F01D 11/04* (2013.01); *F01D 11/001* (2013.01); *F01D 11/02* (2013.01);
(Continued)

(58) Field of Classification Search
CPC ........ F01D 11/001; F01D 11/02; F01D 11/04; F01D 5/3015; F05D 2220/32; F05D 2240/12; F05D 2240/126; F05D 2240/55
See application file for complete search history.

(56) References Cited

U.S. PATENT DOCUMENTS 8,696,320 B2 * 4/2014 Harris, Jr. ............. F01D 5/3015
416/248
9,605,552 B2 3/2017 Wondrasek et al.
(Continued)

OTHER PUBLICATIONS

International Search Report and Written Opinion in corresponding International Patent Application No. PCT/FR2022/051663, mailed Nov. 7, 2022, 11 pages.

*Primary Examiner* — Elton K Wong
(74) *Attorney, Agent, or Firm* — Cozen O'Connor

(57) ABSTRACT

A high-pressure gas turbine for a turbomachine includes a nozzle guide vane assembly, an annular array of movable blades mounted downstream of the nozzle guide vane assembly, a first recirculation cavity, a second recirculation cavity, and a bleed cavity. An upstream sealing element is mounted on the nozzle guide vane assembly and a downstream sealing element is mounted on the annular array of movable blades.

11 Claims, 6 Drawing Sheets

(52) U.S. Cl.
CPC ...... *F05D 2220/32* (2013.01); *F05D 2240/12* (2013.01); *F05D 2240/55* (2013.01)

(56) References Cited

U.S. PATENT DOCUMENTS

| | | | | |
|---|---|---|---|---|
| 11,459,903 | B1 * | 10/2022 | Kim | F01D 9/04 |
| 2006/0275107 | A1 * | 12/2006 | Alvanos | F02C 7/28<br>415/110 |
| 2014/0308133 | A1 * | 10/2014 | Gendraud | F01D 11/006<br>416/193 A |
| 2015/0354391 | A1 | 12/2015 | Li et al. | |

* cited by examiner

HIGH-PRESSURE GAS TURBINE FOR A TURBINE ENGINE AND TURBINE ENGINE

CROSS-REFERENCE TO RELATED APPLICATIONS

This application is a US National phase Application of PCT/FR2022/051663 filed Sep. 2, 2022, which claims priority to French Patent Application No. 2110133 filed Sep. 27, 2021, both of which are hereby incorporated in their entirety.

TECHNICAL FIELD

This description relates to a high-pressure gas turbine for a turbomachine. It also relates to a turbomachine comprising such a gas turbine.

BACKGROUND

Conventionally, as shown in FIG. 1, a turbomachine 10 of the dual-flow turbojet type comprises, from upstream to downstream in the direction that the gases circulate inside turbomachine 10, a fan 14, a low-pressure compressor 16, a high-pressure compressor 18, a combustion chamber 20, a high-pressure turbine 22, a low-pressure turbine 24, and an exhaust nozzle 26. Low-pressure compressor 16, high-pressure compressor 18, combustion chamber 20, high-pressure turbine 22, low-pressure turbine 24, and exhaust nozzle 26 are arranged radially internally to a housing 12 which, radially externally to these elements, defines an annular path 11 in turbomachine 10 in which the gases flow from upstream to downstream.

High-pressure compressor 18 and low-pressure compressor 16 are respectively connected to high-pressure turbine 22 and low-pressure turbine 24 by a respective shaft 15, 17 extending along the longitudinal axis X of rotation of the shafts of turbomachine 10. In the following, orientational qualifiers such as “longitudinal”, “radial”, and “circumferential” are defined in reference to the longitudinal axis. Furthermore, the terms upstream and downstream are defined in relation to the direction the gas circulates within the turbomachine.

High-pressure turbine 22 comprises a plurality of stages, one of them partially represented in FIG. 2, each comprising a nozzle guide vane assembly 30 and a movable wheel 40 mounted downstream of nozzle guide vane assembly 30.

Nozzle guide vane assembly 30 comprises an internal annular platform 34 and an annular array of fixed vanes 32. Each fixed vane 32 extends radially in the annular path 11 and is connected, radially inwards, to internal annular platform 34. Nozzle guide vane assembly 30 generally comprises an annular radial flange 36 for attachment to housing 5.

Movable wheel 40 comprises an annular array of movable blades 42 carried by a disc 41 comprising a plurality of sockets on its outside periphery, each receiving a root 46 of a blade 42. Each movable blade 42 further comprises a sector of an internal annular platform 44 of movable wheel 40, from which a vane 42' extends radially outwards through annular path 11. Internal annular platform 44 thus comprises a plurality of sectors arranged circumferentially end-to-end around the longitudinal axis X.

Internal annular platform 34 of nozzle guide vane assembly 30 and internal annular platform 44 of movable wheel 40 each delimit, radially inwards, annular path 11.

During operation, the gases flowing in annular path 11 find their way into a space formed longitudinally between internal annular platform 34 of nozzle guide vane assembly 30 and internal annular platform 44 of movable wheel 40, which reduces the performance of turbomachine 10. To limit this phenomenon, it is known to arrange, radially internally to internal annular platform 34 of nozzle guide vane assembly 30, an upstream annular deflector 47 of internal annular platform 44 and a downstream annular deflector 54 of an annular sealing element 50 of housing 5. A baffle is thus formed in the longitudinal space between internal annular platform 34 of nozzle guide vane assembly 30 and internal annular platform 44 of movable wheel 44, limiting the radially inward leakage of the gases flowing in annular path 11.

Furthermore, a stream of bleed air collected from low-pressure compressor 16 and/or high-pressure compressor 18 is directed through an annular bleed cavity 62 towards the space formed longitudinally between internal annular platform 34 of nozzle guide vane assembly 30 and internal annular platform 44 of movable wheel 4. This stream of bleed air thus makes it possible to redirect the gases that have entered bleed cavity 62, towards annular path 11.

This solution is not entirely satisfactory, however, as the collection of air from low-pressure compressor 16 and/or high-pressure compressor 18 reduces the efficiency of turbomachine 10. Furthermore, the reentry, into annular path 11, of the bleed air and gases that entered bleed cavity 62 disrupts the flow in annular path 11, which also reduces the performance of turbomachine 10.

SUMMARY

This disclosure improves the situation.

A high-pressure gas turbine is proposed for a turbomachine extending around a longitudinal axis, the turbine comprising:

- a nozzle guide vane assembly comprising an internal annular platform and an annular array of fixed vanes, each fixed vane being connected, radially inwards, to the internal annular platform,
- an annular array of movable blades mounted downstream of the nozzle guide vane assembly, comprising a disc from which blades extend radially outwards,
- an upstream sealing element applied against a downstream face of the nozzle guide vane assembly, and a downstream sealing element applied against an upstream face of the disc of the annular array of movable blades, the downstream sealing element comprising an upstream deflector arranged, at least in part, radially internally to the internal annular platform of the nozzle guide vane assembly, the upstream sealing element comprising a first downstream deflector arranged, in whole or in part, radially internally to the upstream deflector of the upstream sealing element, the first downstream deflector forming a radially outward projection from the sealing element, a radially external end of said first downstream deflector being arranged radially facing said upstream deflector, thus forming a first annular recirculation cavity which is delimited, longitudinally, by the nozzle guide vane assembly and the first downstream deflector, the upstream sealing element comprising a second downstream deflector forming a projection in the downstream direction, the second downstream deflector being arranged radially internally to the first downstream deflector, the downstream sealing element comprising an upstream face extending radially and without any deflector interposed radially between said first downstream deflector and said second downstream deflector of the upstream sealing element, thus forming a second annular recirculation cavity which is delimited by said first downstream deflector and said second downstream deflector of the upstream sealing element and by the upstream face of the downstream sealing element, an annular bleed cavity being delimited between the nozzle guide vane assembly and the annular array of movable blades and located radially internally to the second annular recirculation cavity, a stream of bleed air or a stream of gas being able to flow: between an annular path located radially externally to the internal platform of the nozzle guide vane assembly and the first annular circulation cavity, through a clearance between the internal platform and the upstream deflector; between the first recirculation cavity and the second recirculation cavity, through a clearance between the first downstream deflector and the upstream deflector; and between the second recirculation cavity and the bleed cavity, through a clearance between the second downstream deflector and the downstream sealing element.

The arrangement of the first downstream deflector delimiting the first annular recirculation cavity enables the formation of a swirl, or vortex, in the gases from the annular path which make their way into the first annular recirculation cavity, these gases mixing with a stream of bleed air coming from the second annular recirculation cavity and from the annular bleed cavity. Such a vortex makes it possible, on the one hand, to limit or even prevent the gases of the annular path from flowing further inwards radially, and on the other hand, to redirect these gases towards the annular path. In other words, the vortex obstructs the radially inward flow of gases coming from the annular path. The gases coming from the annular path entering the first annular recirculation cavity are thus advantageously predominantly contained in the first annular recirculation cavity.

The second annular recirculation cavity also enables the formation of a swirl, or vortex, in the gases coming from the first annular recirculation cavity which make their way into the secondary annular recirculation cavity, these gases mixing with a stream of bleed air coming from the annular bleed cavity. As above, such a vortex makes it possible to limit or even prevent the gases from flowing further radially inwards, and to redirect these gases towards the first annular recirculation cavity. In other words, here the vortex obstructs the radially inward flow of gases coming from the first annular recirculation cavity. Gases coming from the first annular recirculation cavity and entering the second annular recirculation cavity are thus advantageously predominantly contained in the secondary annular recirculation cavity.

The amount of gas from the annular path which enters the annular bleed cavity is thus decreased.

Furthermore, the bleed air flow rate required to redirect towards the annular path the gases which make their way into the first and second annular recirculation cavities, is reduced. The elements of the annular array of movable blades are thus better protected. Also, the amount of bleed air taken from the high-pressure compressor and/or the low-pressure compressor is reduced, which makes it possible to improve the efficiency of the turbomachine.

The feature where the first downstream deflector forms a radially outward projection from the sealing element is equivalent, in other words, to the first downstream deflector extending radially outwards from an annular portion of the sealing element. The first downstream deflector may extend from a radially external end of the annular portion of the sealing element.

Furthermore, the feature where the second downstream deflector forms a projection in the downstream direction from the sealing element is equivalent, in other words, to the second downstream deflector extending longitudinally downstream from an annular portion of the sealing element.

In this description, an element referred to as "annular" may comprise a plurality of sectors arranged circumferentially end-to-end around an axis, in particular for 360° around said axis. Of course, an "annular" element may also be one piece, i.e. formed as a single part and not from sectors.

The first annular recirculation cavity may be delimited radially outwards by a radially internal face of the internal annular platform of the nozzle guide vane assembly. The first annular recirculation cavity may form an unencumbered space. In other words, the first annular recirculation cavity may be devoid of any solid element. Similarly, the second annular recirculation cavity may form an unencumbered space. In other words, the second annular recirculation cavity may be devoid of any solid element.

The clearance between the internal platform and the upstream deflector may be an annular clearance which extends radially. This clearance may be between 1 and 4.5 mm.

The clearance between the first downstream deflector and the upstream deflector may be an annular clearance which extends radially. This clearance may be between 0.5 and 3 mm.

The clearance between the second downstream deflector and the downstream sealing element may be an annular clearance which extends axially. This clearance may be between 1.5 and 6 mm.

The dimensions of the above clearances depend on the turbomachine and can be calculated on the transient phases of operation of the turbomachine, taking into account the axial and radial displacements between rotor and stator, which can range from a tenth of a millimeter to several millimeters. It is therefore essential to provide a minimum clearance between the stator and rotor parts in order to avoid any contact during operation of the turbomachine.

The first downstream deflector may extend radially outwards from a radially external end of an annular portion of the upstream sealing element, said first annular recirculation cavity being delimited, radially inwards, by a radially external face of the annular portion of the upstream sealing element, the radially external annular face of said annular portion having, in whole or in part, a concave shape.

The concave shape further encourages the formation of a vortex or swirl within the first recirculation cavity.

The upstream sealing element may include a concave surface connecting the first and second downstream deflectors.

Such a concave surface further encourages the formation of a vortex or swirl within the second recirculation cavity.

The first downstream deflector may extend radially outwards from a radially external end of an annular portion of the upstream sealing element, the first downstream deflector comprising a frustoconical wall which widens in the downstream direction, extending from the radially external and downstream end of the annular portion of the upstream sealing element, and a radial wall extending radially outwards from a downstream end of said frustoconical wall.

The first downstream deflector may comprise a longitudinal wall extending downstream from said radial wall. The longitudinal wall of the first downstream deflector makes it possible to form an additional curve in the channel connecting the annular recirculation cavity and the annular bleed cavity. The pressure losses in the gases flowing in the channel connecting the annular recirculation cavity and the annular bleed cavity are thus increased. This makes it possible to further limit or even prevent the propagation of gases from the annular path towards the annular bleed cavity.

The first downstream deflector may have a plurality of holes, preferably regularly distributed circumferentially around the longitudinal axis. This allows a stream of bleed air to pass through the holes from the second recirculation cavity to the first annular recirculation cavity, particularly where the gas pressure in the second annular recirculation cavity is highest. This further reduces the entry of gases into the first annular bleed cavity, from the annular path.

The plurality of holes may be made through the frustoconical wall of said first downstream deflector.

The second downstream deflector may be cylindrical, i.e. it may extend downstream longitudinally.

The angle between the frustoconical wall of the first downstream deflector and the second downstream deflector is between 30 and 450, preferably between 35 and 40°.

Such an angle encourages the formation of vortices or swirls in each of the first and second recirculation cavities.

The second downstream deflector may be arranged axially opposite a recess or niche provided in the downstream sealing element in order to maintain a minimum axial clearance between the second downstream deflector and the downstream sealing element.

Such a recess or niche makes it possible to encourage the formation of a vortex or swirl in the second recirculation cavity, and prevent the entry of hot gases into the bleed cavity.

The upstream deflector may have a radially external face which is of frustoconical shape with a decreasing cross-section in the upstream direction, extending over at least a first longitudinal portion.

Such a shape makes it easier to discharge the bleed air and gases out of the first recirculation cavity towards the annular path. Furthermore, such a feature allows adapting the direction in which the gases mixed into the annular path are reintroduced into the annular path, in order to minimize disruptions to the gases flowing in the annular path.

The radially external face of said first upstream deflector may be entirely frustoconical in shape with a decreasing cross-section in the upstream direction.

The upstream end of the upstream deflector may be, in whole or in part, radially facing the internal annular platform of the nozzle guide vane assembly.

The nozzle guide vane assembly may further comprise a radial annular flange extending radially inwards from the internal annular platform, the upstream sealing element being attached and fixed to the radial annular flange. Alternatively, the upstream sealing element may be made as integral with the radial annular flange of the nozzle guide vane assembly.

Furthermore, the downstream sealing element may be attached and fixed on an upstream face of the annular array of movable blades, in particular on an upstream face of a disc of said annular array of movable blades. Alternatively, the downstream sealing element may be made as integral with said annular array of movable blades or with said disc.

The second downstream deflector may include a portion which projects radially outwards at its downstream end. Such a feature again makes it possible to encourage the formation of a vortex or swirl in the second recirculation cavity, and to direct it towards the first recirculation cavity.

A radially internal annular face of the internal annular platform of the nozzle guide vane assembly may have, in whole or in part, a concave shape which is arranged radially facing said upstream deflector and/or the first recirculation cavity. Such a concave shape of the radially internal annular face of the internal annular platform of the nozzle guide vane assembly makes it possible to encourage the appearance of a vortex at the interface between the gases coming from the annular path and the bleed air.

The annular array of movable blades may comprise an internal annular platform, said first upstream deflector extending from an upstream end of the internal annular platform.

Each movable blade of the annular array of movable blades may comprise a sector of the internal annular platform, said sectors being arranged circumferentially end-to-end. Each movable blade may comprise a vane extending radially outwards from the respective sector of the internal annular platform. Each movable blade may comprise a blade root extending radially inwards from the respective sector of the internal annular platform. Each blade root may be received in an associated socket formed on the external periphery of the disc. Alternatively, each movable blade is formed as one piece with the respective sector of the internal annular platform.

According to another aspect, a turbomachine is described comprising a high-pressure gas turbine of the aforementioned type.

BRIEF DESCRIPTION OF DRAWINGS

Other features, details, and advantages will become apparent upon reading the detailed description below, and upon analyzing the attached drawings, in which.

DETAILED DESCRIPTION

Figure 1:
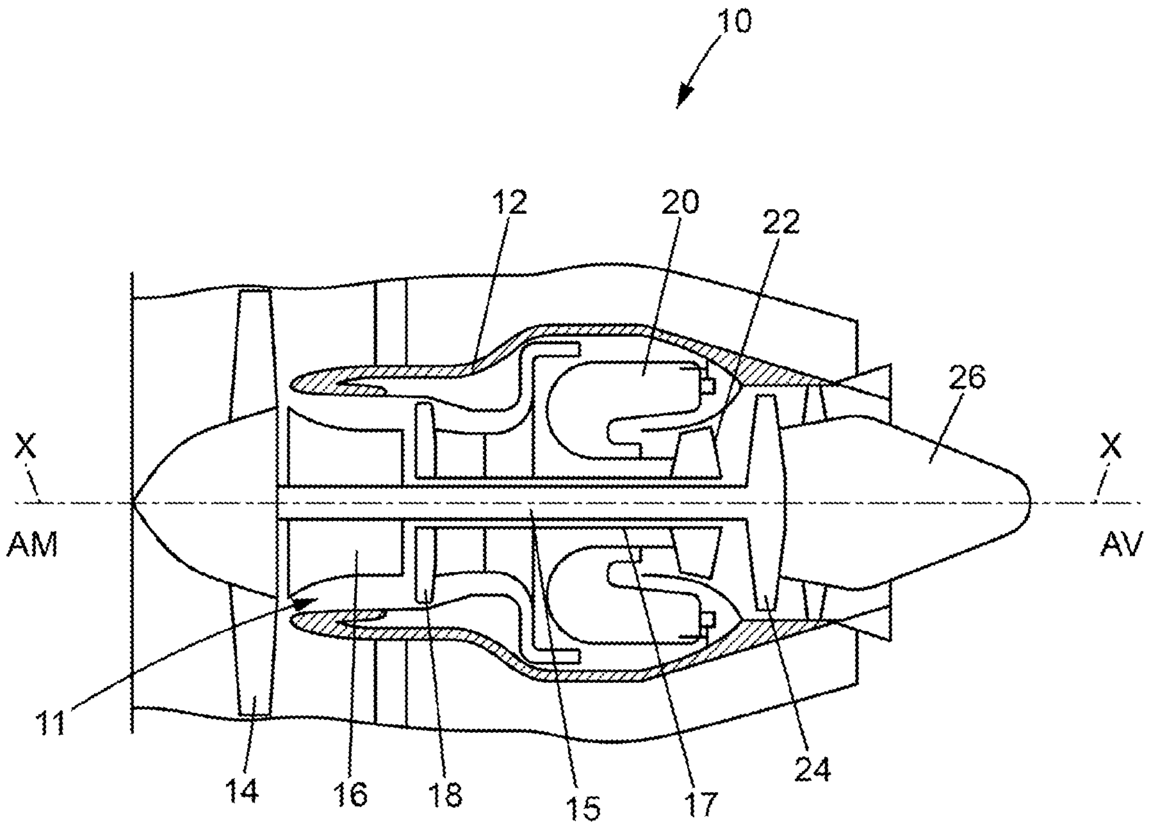
FIG. 1, already described above, is a partial schematic section view of a turbomachine of the prior art.
Figure 2:
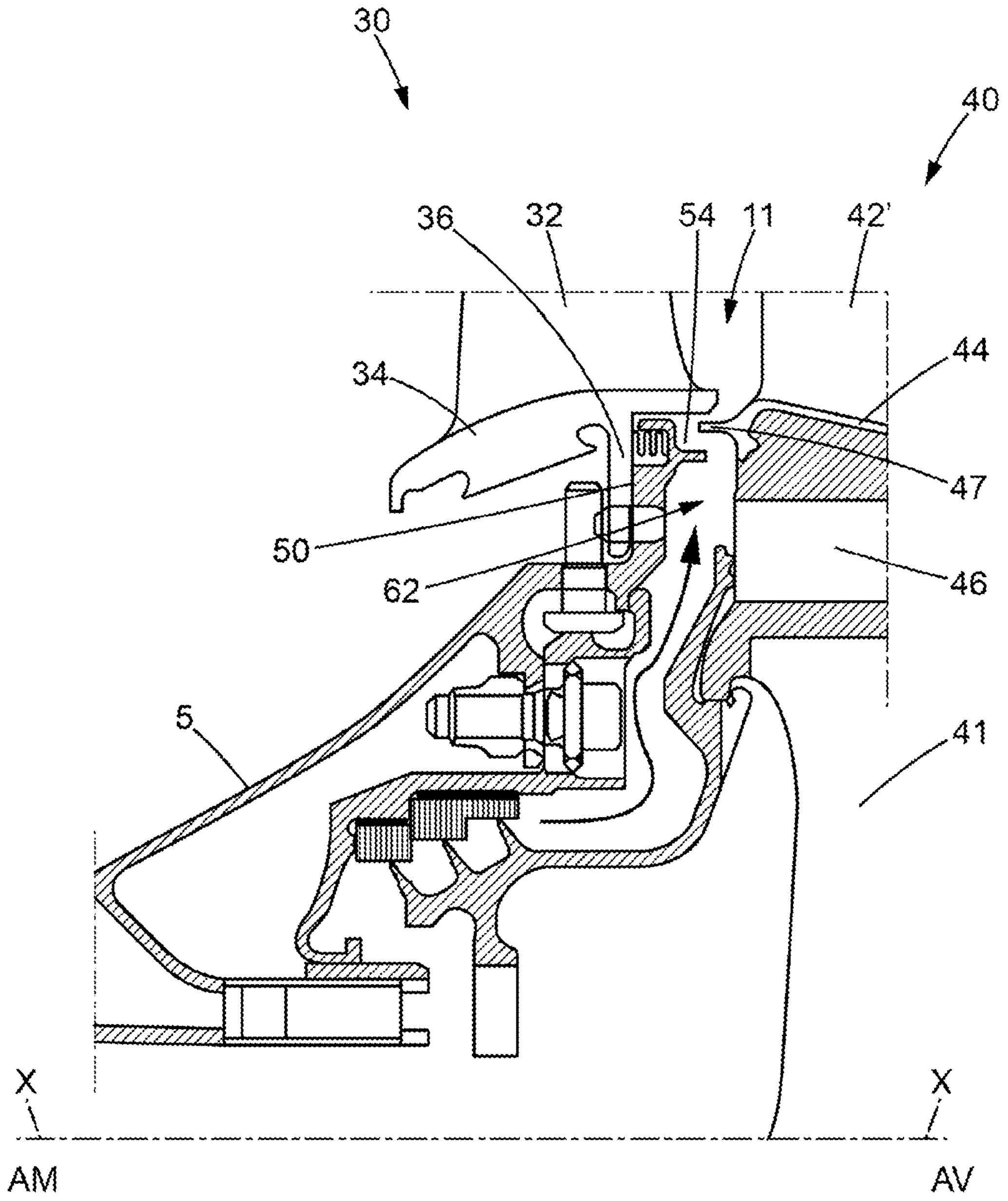
FIG. 2, already described above, is a partial schematic section view of a high-pressure turbine of the turbomachine of FIG. 1.
Figure 3:
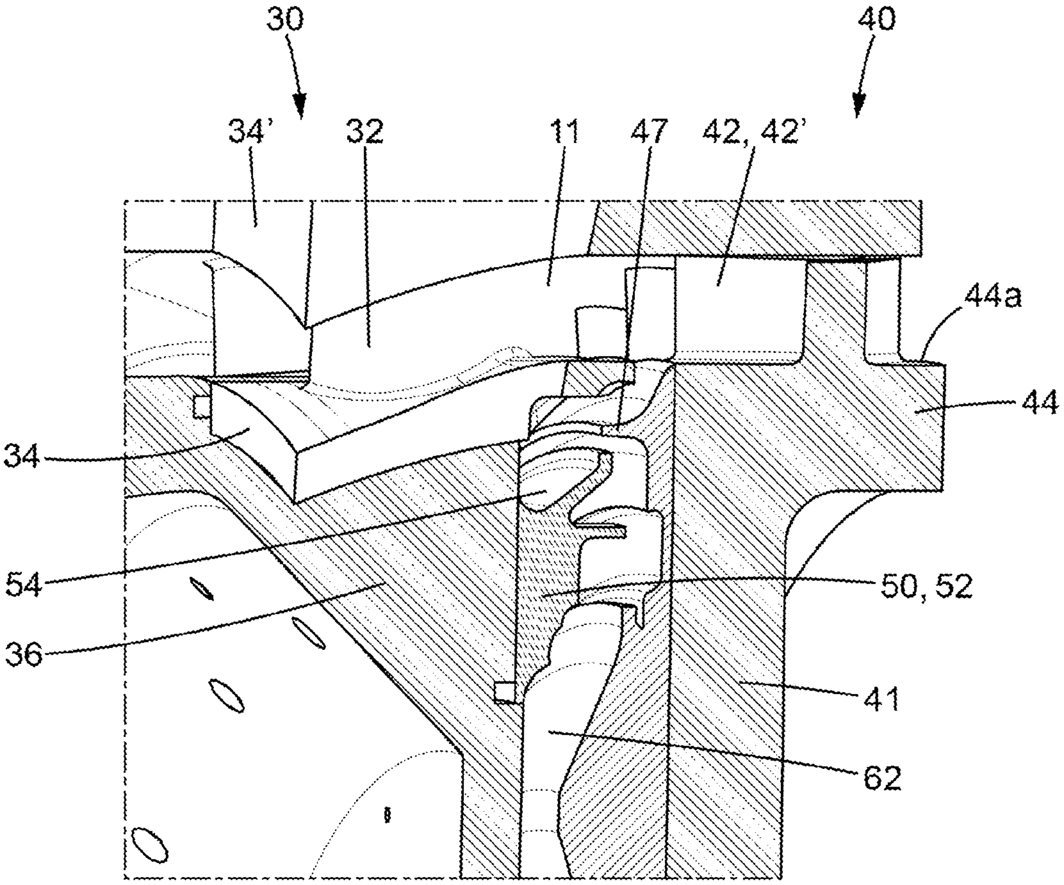
FIG. 3 is a partial schematic perspective and section view of a high-pressure turbine according to one embodiment of this document.
Figure 4:
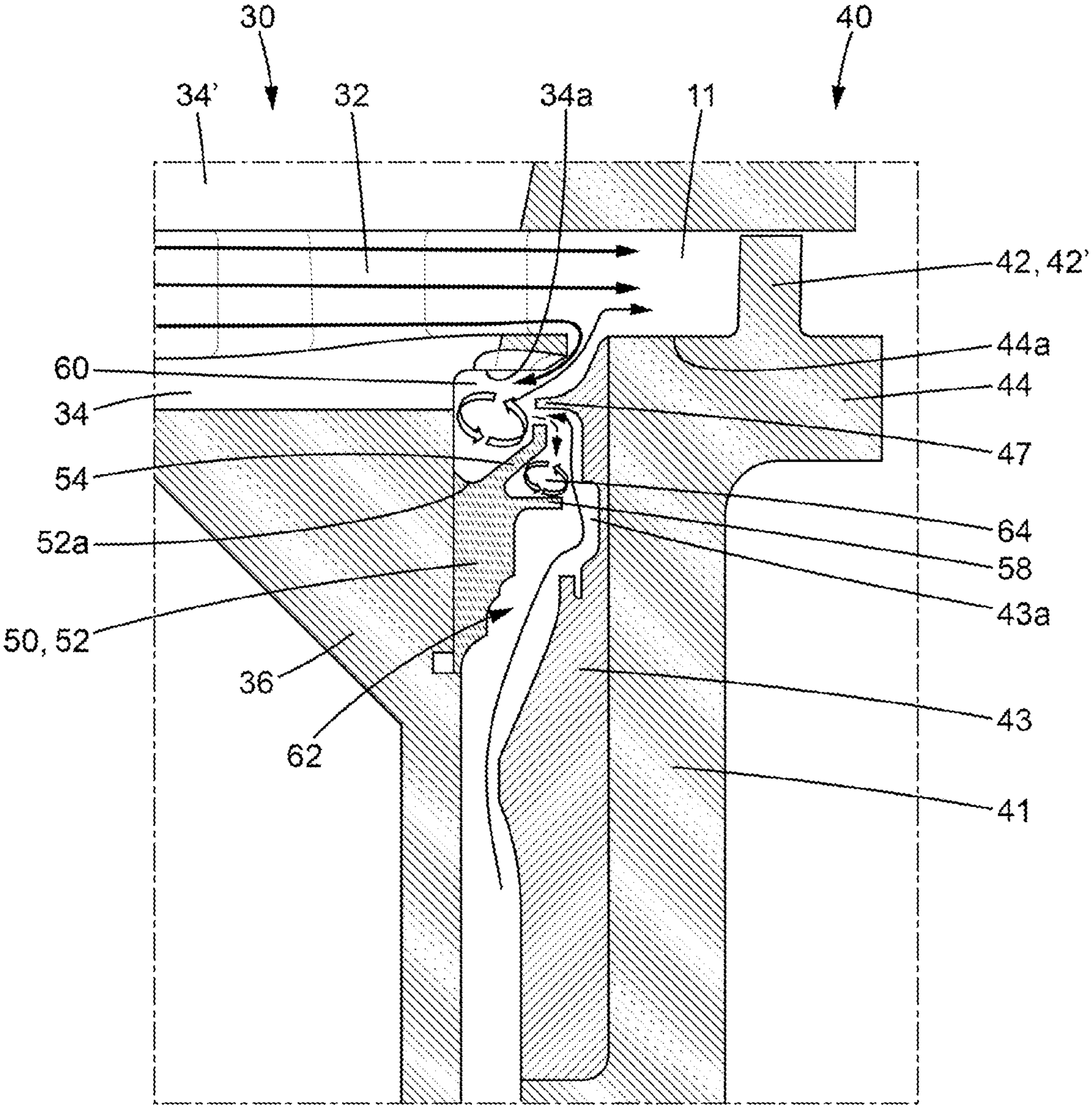
FIG. 4 is a partial schematic section view of the turbine of FIG. 3.
Figure 5:
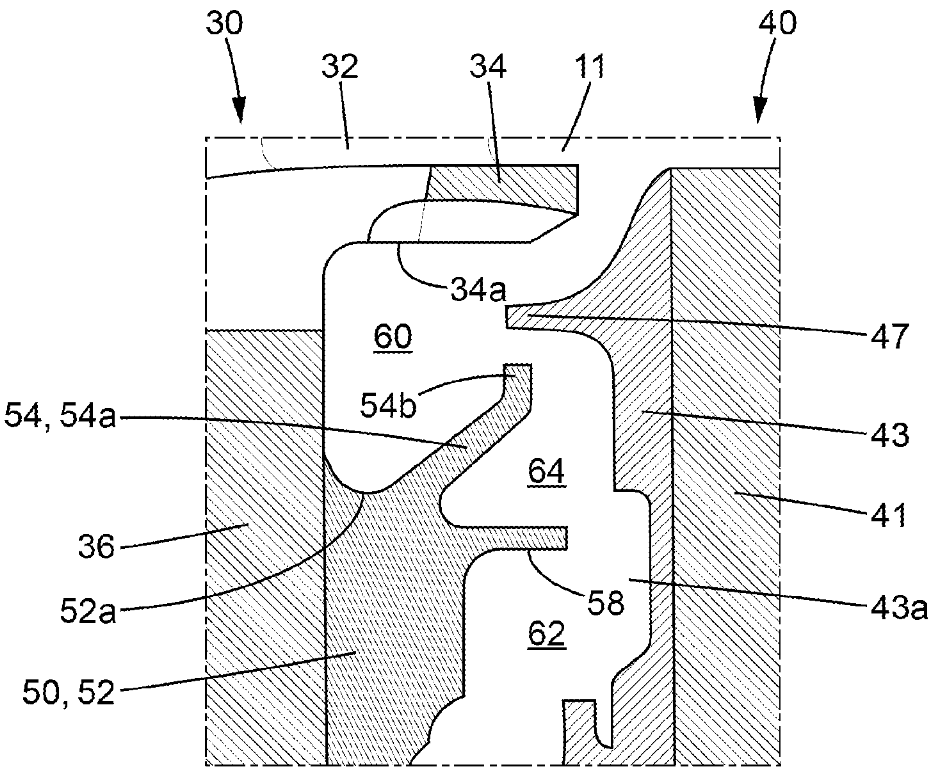
FIG. 5 is a detailed view of FIG. 4.

Reference is now made to FIGS. 3 to 5 which partially represent a high-pressure turbine of a turbomachine of longitudinal axis X, according to a first embodiment. The high-pressure turbine comprises a plurality of stages each comprising a nozzle guide vane assembly 30 and a movable wheel 40 mounted downstream of nozzle guide vane assembly 30.

Nozzle guide vane assembly 30 comprises an annular array of fixed vanes 32. Each fixed vane 32 is connected, radially inwards, to an internal annular platform 34 of nozzle guide vane assembly 30. Each fixed vane 32 extends radially outwards from internal annular platform 34. Each fixed vane 32 is connected, radially outwards, to an external platform 34' connected to an external housing of the high-pressure turbine. A radially external annular face of internal annular platform 34 and a radially internal annular face of external platform 34' delimit, respectively radially inwards and radially outwards, an annular path 11 of turbomachine 10 at nozzle guide vane assembly 30 of the high-pressure turbine. Thus, each fixed vane 32 extends radially inside annular path 11.

Nozzle guide vane assembly 30 further comprises a radial annular flange 36 extending radially inwards from internal annular platform 34. Nozzle guide vane assembly 30 may be connected to an internal turbomachine housing, by means of radial annular flange 36.

Movable wheel 40 comprises an annular array of movable blades 42 carried by a disc 41. Movable wheel 40 comprises an internal annular platform 44. Each movable blade 42 of movable wheel 40 comprises a sector of internal annular platform 44, the sectors being arranged circumferentially end-to-end around the longitudinal axis X. An annular radially external face 44*a* of internal annular platform 44 delimits, radially inwards, annular path 11 at movable wheel 40 of the turbine. Each movable blade 42 comprises a vane 42' extending radially outwards, within annular path 11, from the respective sector of internal annular platform 44.

Movable wheel 40 also comprises a downstream sealing element 43 attached and fixed on an upstream radial surface of disc 41 and of the region comprising platform 44. Downstream sealing element 43 comprises an upstream annular deflector 47 which is annular and which extends at the radially external end of downstream sealing element 43. Upstream annular deflector 47 is arranged, here in part, radially internally to internal annular platform 34 of nozzle guide vane assembly 30. In other words, upstream annular deflector 47 is arranged radially internally to internal annular platform 34 of nozzle guide vane assembly 30 and, in part, radially facing internal annular platform 34 of nozzle guide vane assembly 30. The upstream end of upstream deflector 47 is located longitudinally further upstream than the downstream end of internal platform 34. Downstream sealing element 43 may be an integral part of disc 41 and/or platform 44.

The high-pressure turbine further comprises an upstream sealing element 50, which is annular here, applied against a downstream face of nozzle guide vane assembly 30. Here, upstream sealing element 50 is attached and fixed to radial annular flange 36. To do so, upstream sealing element 50 comprises an annular portion 52 applied against a downstream face of radial annular flange 36 of nozzle guide vane assembly 30. Annular portion 52 of upstream sealing element 50 may be fixed, by for example by bolting, to radial annular flange 36 of nozzle guide vane assembly 30. The upstream sealing element may be an integral part of the housing of the high-pressure turbine.

Upstream sealing element 50 comprises a first downstream deflector 54 which is annular. First downstream annular deflector 54 is arranged, here in part, radially internally to upstream annular deflector 47 of downstream sealing element 43. In other words, first downstream annular deflector 54 is arranged radially internally to upstream annular deflector 47 and, in part, radially facing upstream annular deflector 47. First downstream annular deflector 54 extends radially outwards from a radially external end of annular portion 52 of annular sealing element 50. It is noteworthy that a radially external end 55 of first downstream annular deflector 54 is arranged radially facing upstream annular deflector 47, thus forming a first annular recirculation cavity 60 which is delimited, longitudinally, by nozzle guide vane assembly 30 and first downstream deflector 54. First annular recirculation cavity 60 here is delimited, radially outwards, by a radially internal face 34*a* of internal annular platform 34 of nozzle guide vane assembly 30. First annular recirculation cavity 60 is delimited, radially inwards, by a radially external annular face 52*a* of annular portion 52 of annular upstream sealing element 50. Here, first annular recirculation cavity 60 forms an unencumbered space. In other words, here, first annular recirculation cavity 60 is devoid of any solid element.

It is noteworthy that an unencumbered space is formed, longitudinally, between internal annular platform 34 of nozzle guide vane assembly 30 and internal annular platform 44 of movable wheel 40. Internal annular platform 34 of nozzle guide vane assembly 30 and upstream annular deflector 47 of movable wheel 40 together define a clearance or flow channel between annular path 11 and first annular recirculation cavity 60.

Such an arrangement of first downstream annular deflector 54, delimiting first annular recirculation cavity 60, allows the formation of a vortex or swirl (illustrated by arrows in FIG. 4) in the gases flowing in annular path 11 which find their way into first annular recirculation cavity 60, these gases mixing with a stream of bleed air coming from an annular bleed cavity 62 and from a second annular recirculation cavity 64 located radially inwards between nozzle guide vane assembly 30 and movable wheel 40. Such a vortex makes it possible to limit or even prevent the gases in annular path 11 from flowing further inwards radially, and to redirect these gases towards annular path 11. In other words, the vortex obstructs the radially inward flow of gases coming from annular path 11. The gases coming from annular path 11 and entering first recirculation cavity 60 are thus advantageously contained within cavity 60. The amount of gas from annular path 11 which enters second recirculation cavity 64 and annular bleed cavity 62 is thus reduced.

Furthermore, the bleed air flow rate required to redirect towards annular path 11 the gases which make their way into first annular recirculation cavity 60, is reduced. The elements of movable wheel 40 are thus better protected. Also, the amount of bleed air taken from the high-pressure compressor and/or the low-pressure compressor is reduced, which makes it possible to improve the efficiency of the turbomachine.

With reference to FIG. 5 which is a larger scale view of FIG. 4, one can see that first downstream annular deflector 54 comprises a frustoconical wall 54*a* widening in the downstream direction and extending from the radially external and downstream end of annular portion 52 of annular sealing element 50. The thickness of frustoconical wall 54*a* decreases slightly in the downstream direction. First downstream annular deflector 54 also comprises a radial annular wall 54*b* extending radially outwards from a downstream end of frustoconical wall 54*a*. A radial clearance is formed between the radially external end of first downstream deflector 54 and the upstream deflector 47, allowing the passage of a stream of bleed air coming from second recirculation cavity 64 and from bleed cavity 62. Annular portion 52 of annular sealing element 50 has a radially external annular face 52*a* that is concave in shape.

First downstream annular deflector 54 may also have a plurality of holes (not shown) which may be regularly distributed circumferentially around the longitudinal axis X. The plurality of holes may extend through frustoconical wall 54*a* of first downstream annular deflector 54. This allows a stream of bleed air to pass through holes 56 towards first annular recirculation cavity 60, in particular where the pressure of gases in first annular recirculation cavity 60 is highest. This further reduces the entry of gases from annular path 11 into second recirculation cavity 64 and into annular bleed cavity 62.

Furthermore, as can be seen in FIGS. 3 and 4, first upstream annular deflector 47 has a radially external annular face 47*a* which is of frustoconical shape with a decreasing cross-section in the upstream direction and which extends over a first longitudinal portion of first annular upstream deflector 47. The first portion of upstream annular deflector 47 is, here in part, radially facing internal annular platform 34 of nozzle guide vane assembly 30 Radially external annular face 47*a* of the first portion of upstream annular deflector 47 is here connected to radially external annular face 44*a* of internal annular platform 44 of movable wheel 40, in particular by a rounded portion.

In operation, the gases from annular path 11 which make their way into first annular recirculation cavity 60 via the channel or clearance formed between upstream annular deflector 47 and internal annular platform 34 of nozzle guide vane assembly 30, are mixed with the stream of bleed air in order to be redirected towards annular path 11. Such a radially external annular face 47*a* of upstream annular deflector 47 allows adapting the direction in which the gases mixed into annular path 11 are reintroduced into annular path 11, in order to minimize disruptions to the gases flowing in annular path 11. In particular, the conicality of radially external annular face 47*a* of upstream annular deflector 47 could be chosen so as to minimize disruptions to the gases flowing in annular path 11.

Radially internal annular face 34*a* of internal annular platform 34 of nozzle guide vane assembly 30 has, here in part, a concave shape which is arranged radially facing upstream annular deflector 47. Such a concave shape of radially internal annular face 34*a* of internal annular platform 34 of nozzle guide vane assembly 30 makes it possible to encourage the appearance of a vortex at the interface between the gases coming from annular path 11 and the bleed air.

Furthermore, upstream sealing element 50 comprises a second downstream annular deflector 58 arranged radially internally to first downstream annular deflector 54. Second downstream annular deflector 58 extends longitudinally in the downstream direction from annular portion 52 of annular sealing element 50. Second downstream deflector 58 has a cylindrical shape and forms an angle of between 30 and 450, preferably between 35 and 40°, with frustoconical wall 54*a* of first downstream deflector 54. Second downstream deflector 58 is located axially opposite an annular recess 43*a* provided in downstream sealing element 43. An axial clearance is formed between the downstream end of second downstream deflector 58 and the bottom wall of recess 43*a*, so as to allow the passage of a stream of bleed air coming from bleed cavity 62.

Second recirculation cavity 64 is delimited by first downstream deflector 54, second downstream deflector 58, and the upstream surface of second sealing element 43.

During operation, a small amount of gases coming from first annular recirculation cavity 60 may enter second recirculation cavity 64 through the clearance formed between upstream deflector 47 and first downstream deflector 54. These gases are then mixed with the stream of bleed air coming from bleed cavity 62, entering second recirculation cavity 64 through the clearance formed between second downstream deflector 58 and downstream sealing element 43. Once mixed with the air, these gases are redirected towards first recirculation cavity 60 then towards annular path 11. The shape of second cavity 64 makes it possible to generate vortices or swirls, illustrated by arrows in FIG. 4, which allow facilitating such mixing and venting. This limits or even prevents the gases from flowing towards bleed cavity 62.

Figure 6:
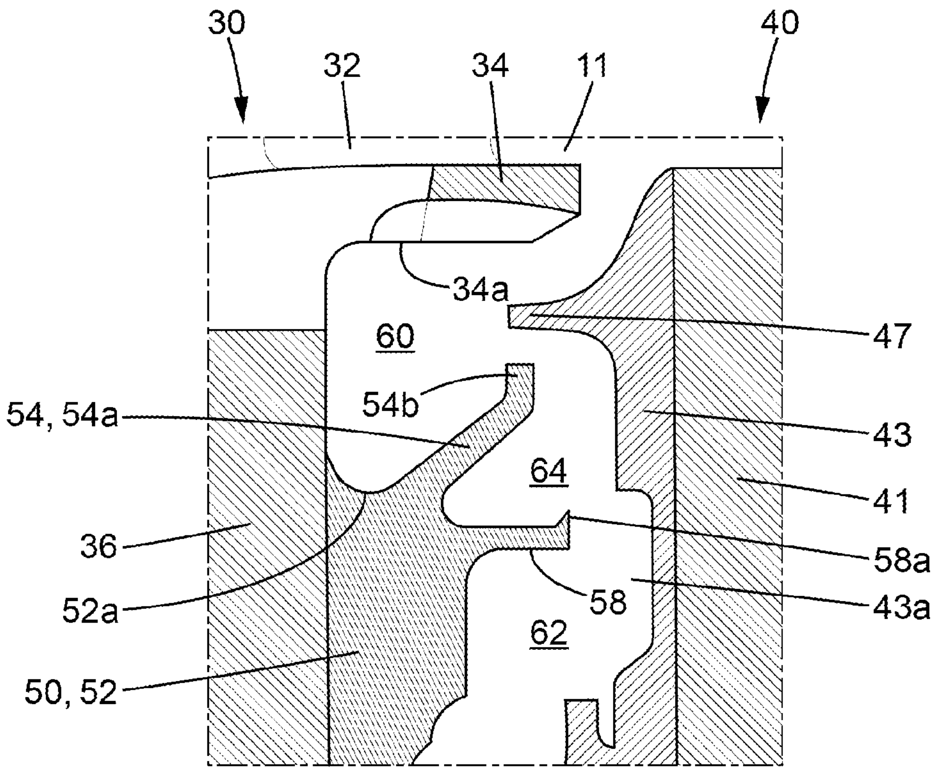
FIG. 6 is a view corresponding to FIG. 5, illustrating an alternative embodiment.

FIG. 6 illustrates a variant embodiment in which part of second downstream deflector 58, for example the downstream end of the second downstream deflector, comprises a portion 58*a* projecting radially outwards, for example an angled portion projecting radially outwards and longitudinally downstream. Such a projecting portion 58*a* makes it possible to further improve the venting efficiency of the vortex created at second recirculation cavity 64.

The invention is not limited to the examples described above and numerous variations are possible. In particular, the embodiments can be combined.

According to a variant not shown, annular sealing element 50 may be made as integral with radial annular flange 36 of nozzle guide vane assembly 30.

According to a variant not shown, annular sealing element 50 may comprise a plurality of sectors arranged circumferentially end-to-end around the longitudinal axis X.

The invention claimed is:

1. A high-pressure gas turbine for a turbomachine (10) extending around a longitudinal axis (X), the turbine comprising:

a nozzle guide vane assembly (30) comprising an internal annular platform (34) and an annular array of fixed vanes (32), each fixed vane (32) being connected, radially inwards, to the internal annular platform (34), an annular array of movable blades (40) mounted downstream of the nozzle guide vane assembly (30), comprising a disc (41) from which blades (42) extend radially outwards, an upstream sealing element (50) applied against a downstream face of the nozzle guide vane assembly (30), and a downstream sealing element (43) applied against an upstream face of the disc (41) of the annular array of movable blades (40), the downstream sealing element (43) comprising an upstream deflector (47) arranged, at least in part, radially internally to the internal annular platform (34) of the nozzle guide vane assembly (30), the upstream sealing element (50) comprising a first downstream deflector (54) arranged, in whole or in part, radially internally to the upstream deflector (47) of the downstream sealing element (43), the first downstream deflector (54) forming a radially outward projection from the upstream sealing element (50), a radially external end (55) of said first downstream deflector (54) being arranged radially facing said upstream deflector (47), thus forming a first annular recirculation cavity (60) which is delimited, longitudinally, by the nozzle guide vane assembly (30) and the first downstream deflector (54), the upstream sealing element (50) comprising a second downstream deflector (58) forming a projection in the downstream direction, the second downstream deflector (58) being arranged radially internally to the first downstream deflector (54), the downstream sealing element (43) comprising an upstream face extending radially and without any deflector interposed radially between said first downstream deflector (54) and said second downstream deflector (58) of the upstream sealing element (50), thus forming a second annular recirculation cavity (64) which is delimited by said first downstream deflector (54) and said second downstream deflector (58) of the upstream sealing element (50) and by the upstream face of the downstream sealing element (43), an annular bleed cavity (62) being delimited between the nozzle guide vane assembly (30) and the annular array of movable blades (40) and located radially internally to the second annular recirculation cavity (64), a stream of bleed air or a stream of gas being able to flow: between an annular path (11) located radially externally to the internal platform (34) of the nozzle guide vane assembly (30) and the first annular recirculation cavity (60), through a clearance between the internal platform (34) and the upstream deflector (47); between the first annular recirculation cavity (60) and the second annular recirculation cavity (64), through a clearance between the first downstream deflector (54) and the upstream deflector (47); and between the second annular recirculation cavity (64) and the bleed cavity (62), through a clearance between the second downstream deflector (58) and the downstream sealing element (43).

2. The turbine according to claim 1, wherein the first downstream deflector (54) extends radially outwards from a radially external end of an annular portion (52) of the upstream sealing element (50), said first annular recirculation cavity (60) being delimited, radially inwards, by a radially external face (52*a*) of the annular portion (52) of the upstream sealing element (50), the radially external annular face (52*a*) of said annular portion (52) having, in whole or in part, a concave shape.

3. The turbine according to claim 1, wherein the first downstream deflector (54) extends radially outwards from a radially external end of an annular portion (52) of the upstream sealing element (4350), the first downstream deflector (54) comprising a frustoconical wall (54*a*) which widens in the downstream direction, extending from the radially external and downstream end of the annular portion (52) of the upstream sealing element (50), and a radial wall (54*b*) extending radially outwards from a downstream end of said frustoconical wall (54*a*).

4. The turbine according to claim 3, wherein the angle between the frustoconical wall (54*a*) of the first downstream deflector (54) and the second downstream deflector (58) is between 3° and 45°.

5. The turbine according to claim 3, wherein the angle between the frustoconical wall (54*a*) of the first downstream deflector (54) and the second downstream deflector (58) is between 35 and 40°.

6. The turbine according to claim 1, wherein the second downstream deflector (58) is cylindrical.

7. The turbine according to claim 1, wherein the second downstream deflector (58) is arranged axially opposite a recess (43*a*) or a niche provided in the downstream sealing element (43).

8. The turbine according to claim 1, wherein the upstream deflector (47) has a radially external face (47*a*) which is of frustoconical shape with a decreasing cross-section in the upstream direction, extending over at least a first longitudinal portion.

9. The turbine according to claim 1, wherein the nozzle guide vane assembly (30) further comprises a radial annular flange (36) extending radially inwards from the internal annular platform (34), the upstream sealing element (50) being attached and fixed to the radial annular flange (36).

10. The turbine according to claim 1, wherein the second downstream deflector (58) includes a portion (58*a*) which projects radially outwards at its downstream end.

11. A turbomachine comprising a high-pressure gas turbine according to claim 1.

* * * * *